(12) United States Patent
Moshe

(10) Patent No.: US 9,197,881 B2
(45) Date of Patent: Nov. 24, 2015

(54) SYSTEM AND METHOD FOR PROJECTION AND BINARIZATION OF CODED LIGHT PATTERNS

(75) Inventor: Sagi Ben Moshe, Kiryat Bialik (IL)

(73) Assignee: Intel Corporation, Santa Clara, CA (US)

( * ) Notice: Subject to any disclaimer, the term of this patent is extended or adjusted under 35 U.S.C. 154(b) by 487 days.

(21) Appl. No.: 13/533,118

(22) Filed: Jun. 26, 2012

(65) Prior Publication Data

US 2013/0058071 A1 Mar. 7, 2013

Related U.S. Application Data

(60) Provisional application No. 61/531,626, filed on Sep. 7, 2011.

(51) Int. Cl.
| | |
|---|---|
| *G03B 15/02* | (2006.01) |
| *F21V 9/00* | (2015.01) |
| *F21V 11/00* | (2015.01) |
| *F21V 5/00* | (2015.01) |
| *H04N 13/02* | (2006.01) |
| *G01B 11/25* | (2006.01) |

(52) U.S. Cl.
CPC ............ *H04N 13/0253* (2013.01); *G01B 11/25* (2013.01)

(58) Field of Classification Search
CPC . G01B 11/25; G01B 11/2509; H04N 13/0253
USPC ............ 356/610–619, 4.01, 3.01; 385/10, 15; 345/214, 690; 348/42
See application file for complete search history.

(56) References Cited

U.S. PATENT DOCUMENTS

| | | | |
|---|---|---|---|
| 5,509,090 A * | 4/1996 | Maruyama et al. ........... | 382/276 |
| 7,576,845 B2 * | 8/2009 | Asakura et al. ................. | 356/73 |
| 8,743,158 B2 * | 6/2014 | Kang ............................ | 345/690 |
| 2003/0223083 A1 * | 12/2003 | Geng ............................. | 356/603 |
| 2008/0062431 A1 * | 3/2008 | Goldman ...................... | 356/499 |
| 2009/0046301 A1 * | 2/2009 | Asakura et al. ................ | 356/610 |
| 2010/0073461 A1 * | 3/2010 | Hammes et al. ................ | 348/42 |
| 2010/0202725 A1 * | 8/2010 | Popovich et al. ............... | 385/10 |
| 2010/0214282 A1 * | 8/2010 | Whitehead et al. ........... | 345/214 |
| 2011/0019112 A1 * | 1/2011 | Dolgoff .......................... | 349/8 |
| 2012/0236288 A1 * | 9/2012 | Stanley ......................... | 356/4.01 |
| 2013/0028504 A1 * | 1/2013 | Malek et al. .................. | 382/141 |

* cited by examiner

*Primary Examiner* — Sang Nguyen
(74) *Attorney, Agent, or Firm* — Trop Pruner & Hu, P.C.

(57) ABSTRACT

In a time-multiplexed structured (coded) light camera, the coded light patterns are formed by means of an array of laser sources, and binarizations of the light patterns are performed by computing the dark and bright frames from the code patterns themselves.

6 Claims, 2 Drawing Sheets

SYSTEM AND METHOD FOR PROJECTION AND BINARIZATION OF CODED LIGHT PATTERNS

This application is a non-provisional application claiming priority to provisional application Ser. No. 61/531,626, filed on Sep. 7, 2011, which is hereby expressly incorporated by reference herein.

BACKGROUND

Coded light is a method for three-dimensional (3D) geometry acquisition, in which the object of interest is illuminated by a time-multiplexed sequence of patterns, e.g., horizontal strips of varying width, forming a binary code. Using a camera calibrated with the projecting system, the 3D geometry is recovered by triangulation (the code allows to establish correspondence between the camera and the projector coordinate systems).

A critical element of a coded light camera is the projection system capable of illuminating the object with a rapidly changing sequence of patterns. Typically, 88-10 patterns are required to reconstruct a 3D image with sufficiently high resolution; hence, in order to acquire 30 3D frames/second, the projector must be able to project the patterns at 200 fps. Current available designs based e.g. on TI DMD micro-mirror arrays are too expensive.

Typically, the sequence of projected patterns consists of b binary code patterns ($I_0, \ldots, I_b$), for example, plain binary or Gray code. Since the patterns are projected into an object with potentially widely varying reflectivity properties (albedo) and due to background illumination, the image of the object illuminated by each pattern acquired by means of the camera contains continuous gray levels that must be binarized (converted into values of 1 at illuminated pixels and 0 at dark pixels). for this purpose, additional patterns B (full dark) and W (full bright) are often used. The binarization of code patter I at each pixel is performed according to the following formula: $I'=(I-B)/(W-B)$. The pixel is assigned the value of 1 is $I'>0$ and 0 if $I'<0$.

Next, the binarized images $I'_0, \ldots, I'_b$ are used to form a code C at each pixel; for example, if plain binary code is used, $C=I'_b+2^1 I'_{b-1}+2^2 I'_{b-2}+\ldots 2^b I'_0$. The code image C encodes the number of a horizontal plane in projector system of coordinates; from its intersection with a ray in the camera system of coordinates (assuming calibrated system), the 3D coordinates of each pixel are recovered.

With such an approach, in order to obtain a single 3D frame, it is required to project b+2 patterns. If the projection rate is P fps, the frame rate of the 3D camera system, is (b+2)/p 3D frames/sec.

Furthermore, due to possible motion of the scanned object, the dark and bright frames B and W will be updated at the rate p/(b+2) frames/sec. As a result, the binarization of the code patterns will be incorrect due to the displacement of pixels between a code pattern I and the frames B and W. This will result in wrong code reconstruction. The most significant effect will be caused in most significant bits (MSB) of the code (patterns $I_0, 1_1$, etc.). For this reason, it is desirable to place B and W as close as possible to the MSB patterns, e.g. as B W $I_0 I_1 I_2 \ldots I_b$ B W $I_0 I_1 \ldots I_b$

BRIEF DESCRIPTION OF THE DRAWINGS

Some embodiments are described with respect to the following figures.

DETAILED DESCRIPTION

The present invention deals with two aspects of the aforementioned general method of coded light 3D acquisition, and proposes an efficient system for the creation of coded illumination patterns and a method aiming to increase the frame rate of the system by eliminating the need to project the bright and dark patterns (B and W).

Figure 1:
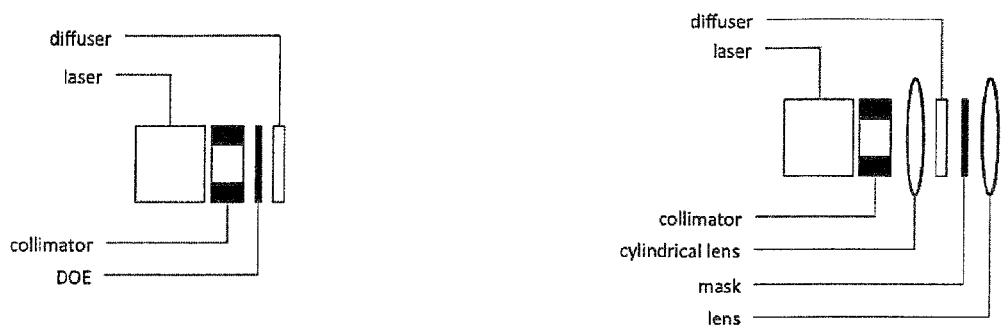
FIG. 1 is a single optical subsystem according to one embodiment to the present invention.
Figure 2:
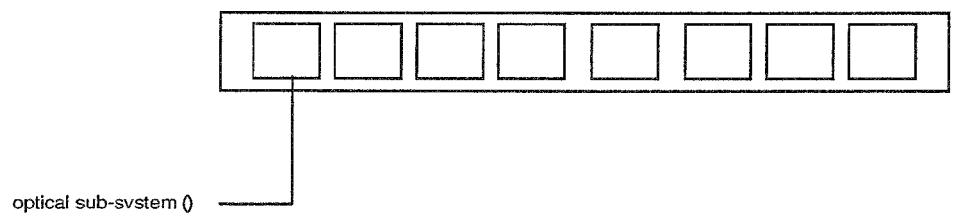
FIG. 2 depicts an array of optical subsystems (horizontal arrangements)

The proposed design involves a fixed on-dimensional array of optical sub-systems, consisting of light sources (e.g. laser diodes or vertical cavity surface emitting diode lasers (VC-SEL)), coupled with an array of masks (diffraction optical element (DOE) or simple optical filters), as schematically illustrated in FIG. 1. Each such sub-system pair is responsible for the creation of a code pattern. The time multiplexing is achieved by electronic switching of the lasers in the array at the frequency corresponding to the rate of patterns change.

In one preferred embodiment, each optical sub-system consists of a laser source, possible collimator, DOE mask, and a diffuser.

In another preferred embodiment, each optical sub-system consists of a laser source, possible collimator, possible cylindrical lens, DOE mask, diffuser, and a focusing lens.

The one-dimensional array of lasers is arranged in the direction opposite to the binary code direction, i.e., if the code patterns are horizontal striped, the lasers are arranged into a horizontal line.

The whole device would be a manufactured on a single semiconductor allowing for efficient switching between patterns at a compact form factor that could be integrated into handheld devices, laptops, TV-sets, set-top boxes, cellphones, portable and stationary devices, to name just a few applications.

Since the binary code (e.g. plain binary or Gray code) is complete, the time-multiplexed code sequenced at each pixel contains at least one 1 and at lease one 0, excepting the two lines of pixels (all zeros and all ones). For example, if plain binary code is used and b=3, the pixels at lines 001, 010, 011, 100, 101, 110 will be illuminated at least one and be darkened at least once (pixels at lines 000 and 111 will not; however, these would be typically the first and the last lines which can be outside the field of view of the camera).

Thus, taking a minimum and maximum at each pixel over one period of the code sequence will give the dark and bright pixel values. This allows reconstructing B and W rather than explicitly projecting them, as follows:

$$B=\min \{I_0 I_1 I_2 \ldots I_b\}$$

$$W=\max \{I_0 I_1 I_2 \ldots I_b\}$$

The advantage of this approach is that there is no need to project patterns B and W which carry no code information; thus, the frame rate is b/p compared to (b+2)/p.

An alternative approach is instead of projecting the sequence of bit patterns $I_0 I_1 I_2 \ldots I_b$, to project alternating sequences of normal and inverted patterns $!I_0 I_1 I_2 \ldots !I_b$, where !I is the pattern I, in which dark pixels are replaced by illuminated ones, and illuminated pixels are replaced by dark ones. the dark and bright pixel values can be reconstructed as $$B=\min \{I, !I\}$$

$$W = \max\{I, !I\}$$

The advantage of this approach is that there is no need to project patterns B and W which carry no code information; thus, the frame rate is b/p compared to (b+2)/p.

Furthermore, the frequency of updating B and W can be increased two-fold by placing inverted patterns at each boundary of pattern sequence, e.g.

$$I_0 I_1 I_2 \ldots I_b\, !I_b I_1 I_2 \ldots I_b\, !I_0\, I_0 I_1 I_2 \ldots I_b$$

Figure 3:
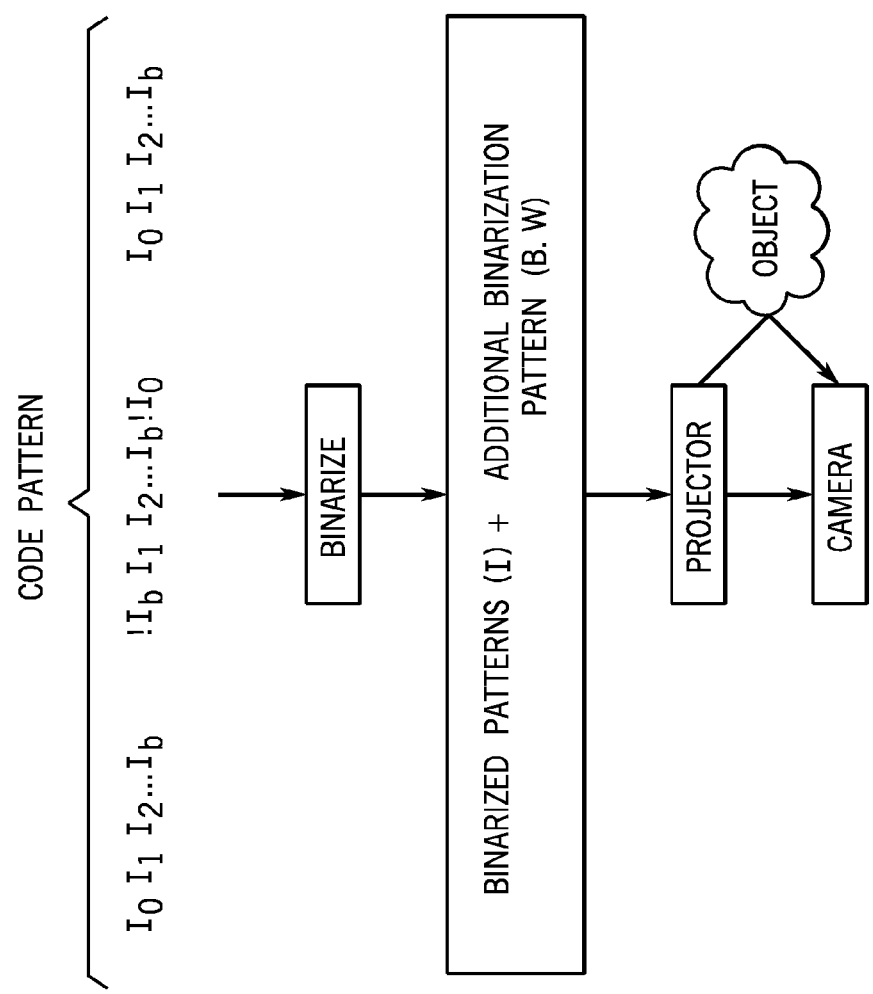
FIG. 3 depicts a system according to one embodiment.

In this example, B and W are reconstructed from the pair $I_0!I_b$ and $I_b!I_b$ Referring to FIG. 3, one embodiment is depicted in which a code pattern is binarized and then an additional binarization pattern is added. The code pattern includes an inverted segment $!I_b I_1 I_2 \ldots I_b !I_0$. This pattern is then binarized to create a binarized pattern I and an additional binarization pattern which, in one embodiment, may be the all dark and all white frames denoted BW. This combined pattern in then provided to a projector which projects a light pattern according to the code onto an object. The light pattern is imaged by the camera.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A coded light three-dimensional acquisition system comprising of:
   a projector including an array of optical subsystems, each designed to project a different light pattern, and
   a switching circuit to controllably turn on or off each subsystem, and a camera, electronically synchronized with the projector in such a way that the projector emits a sequence of patterns and the camera captures the scene illuminated by the projected patterns,
   wherein the sequence of patterns includes code patterns and additional binarization patterns, wherein the binarization patterns are reconstructed from the code patterns, and wherein the binarization patterns are reconstructed from the code patterns by taking minimum and maximum in time at each pixel.

2. A system as in claim 1, wherein the sequence of patterns consists of code patterns.

3. A system as in claim 1, wherein the binarization patterns are full bright and full dark frame.

4. A system as in claim 3, wherein the full dark frame is obtained by switching off all the optical sub-systems.

5. A system as in claim 2, wherein patterns include normal and inverted code patterns.

6. A system as in claim 1, wherein the binarization patterns are reconstructed from pairs of corresponding normal and inverted code patterns by taking minimum and maximum at each pixel.

* * * * *